US 11,772,907 B2

(12) United States Patent
Testoni et al.

(10) Patent No.: US 11,772,907 B2
(45) Date of Patent: Oct. 3, 2023

(54) TRANSPORT SYSTEM FOR AN AT LEAST PARTIALLY COMPLETE CARTRIDGE, IN PARTICULAR FOR AN ELECTRONIC CIGARETTE

(71) Applicant: G.D SOCIETA' PER AZIONI, Bologna (IT)

(72) Inventors: Luca Testoni, Bologna (IT); Andrea Dondini, Bologna (IT); Francesco Renco, Bologna (IT); Luca Federici, Bologna (IT)

(73) Assignee: G.D SOCIETA' PER AZIONI, Bologna (IT)

( * ) Notice: Subject to any disclaimer, the term of this patent is extended or adjusted under 35 U.S.C. 154(b) by 0 days.

(21) Appl. No.: 17/610,146

(22) PCT Filed: Jun. 12, 2020

(86) PCT No.: PCT/IB2020/055538
§ 371 (c)(1),
(2) Date: Nov. 9, 2021

(87) PCT Pub. No.: WO2020/250196
PCT Pub. Date: Dec. 17, 2020

(65) Prior Publication Data
US 2022/0219911 A1    Jul. 14, 2022

(30) Foreign Application Priority Data
Jun. 13, 2019 (IT) .................. 102019000008817

(51) Int. Cl.
*B65G 47/44* (2006.01)
*A24F 40/70* (2020.01)
(Continued)

(52) U.S. Cl.
CPC .............. *B65G 47/44* (2013.01); *A24F 40/70* (2020.01); *B65B 65/003* (2013.01); *B65G 47/90* (2013.01); *B65G 54/02* (2013.01)

(58) Field of Classification Search
CPC ....... A24F 40/70; B65B 65/003; B65G 47/44; B65G 47/90; B65G 47/847; B65G 17/32
(Continued)

(56) References Cited

U.S. PATENT DOCUMENTS 5,064,187 A * 11/1991 Muller ................. B65H 29/003
                                                     294/99.1
5,395,151 A *  3/1995 Eberle ................. B65H 29/003
                                                     294/99.1

(Continued)

FOREIGN PATENT DOCUMENTS

GB         2220612      *  8/1988  ............. B65G 37/00

OTHER PUBLICATIONS

International Search Report and Written Opinion for corresponding International Application No. PCT/IB2020/055538, dated Oct. 2, 2020.

*Primary Examiner* — James R Bidwell

(57) ABSTRACT

A transport system for an at least partially complete cartridge has: at least one piece of movable equipment provided with at least one seat designed to contain the cartridge and delimited by a first wall and by a second wall beside and opposite one another; a conveyor to move the movable equipment along a path; and an operating device arranged along the path, outside of and independent from the movable equipment. The first wall is mounted on the movable equipment and movable closer to and away from the second wall between a holding position, in which there is a minimum distance between the first and second walls and a release position, in which there is a maximum distance between the first and second walls. An elastic element that pushes the
(Continued)

first wall towards the holding position, and a control appendage moves the first wall towards the release position.

13 Claims, 15 Drawing Sheets

(51) Int. Cl.
*B65B 65/00* (2006.01)
*B65G 47/90* (2006.01)
*B65G 54/02* (2006.01)

(58) Field of Classification Search
USPC ..... 198/803.3, 803.7, 803.9, 867.02, 867.05, 198/867.07
See application file for complete search history.

(56) References Cited

U.S. PATENT DOCUMENTS

| | | | | |
|---|---|---|---|---|
| 6,227,588 | B1 * | 5/2001 | Cassoni | B65H 5/08 |
| | | | | 294/99.1 |
| 6,321,897 | B1 * | 11/2001 | Cassoni | B65H 29/38 |
| | | | | 198/465.1 |
| 7,185,753 | B2 * | 3/2007 | Hartness | B65G 47/5104 |
| | | | | 198/474.1 |
| 2015/0223522 | A1 | 8/2015 | Ampolini et al. | |
| 2017/0311644 | A1 | 11/2017 | Collett et al. | |
| 2018/0084835 | A1 * | 3/2018 | Ampolini | B23P 21/004 |

* cited by examiner

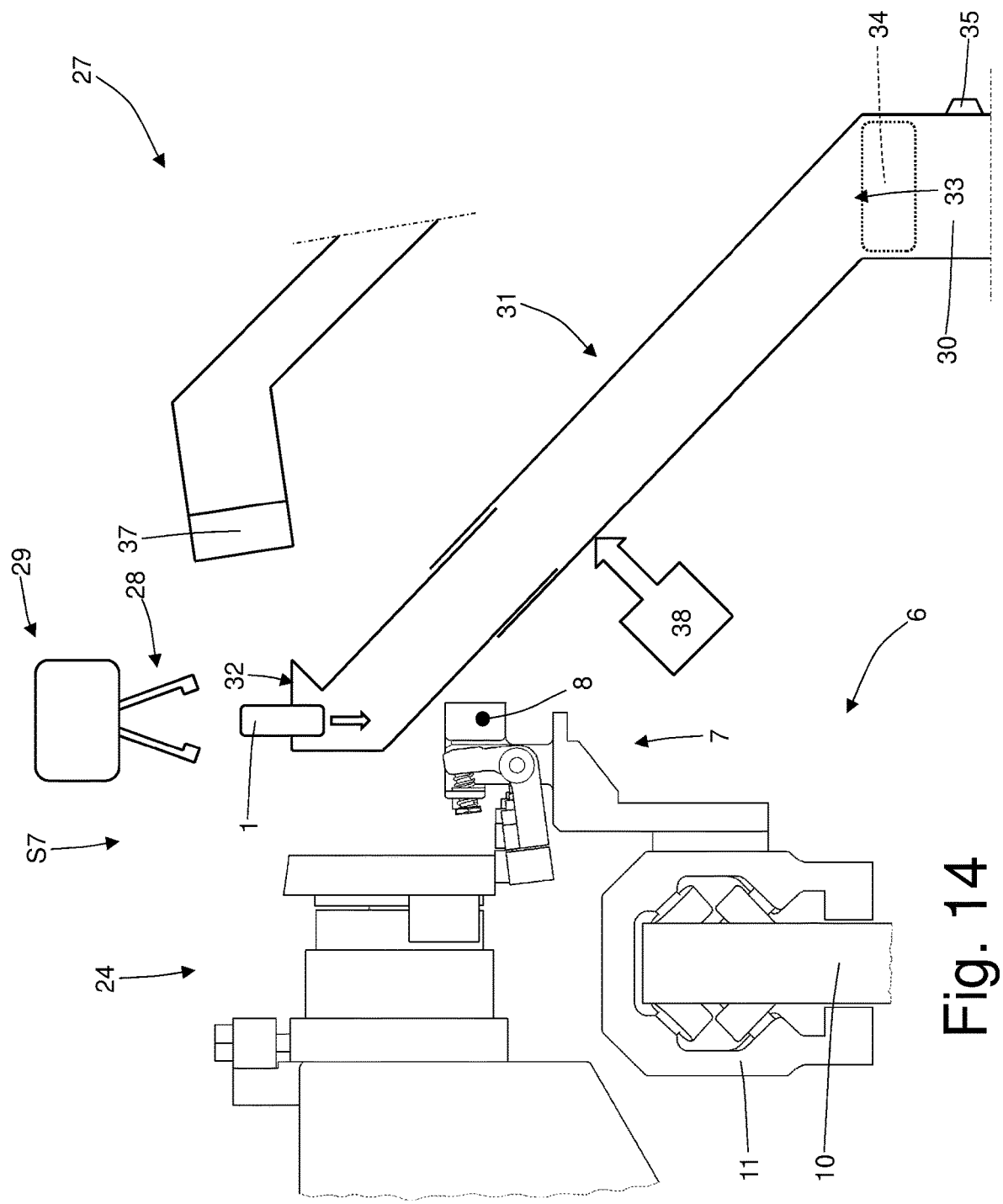

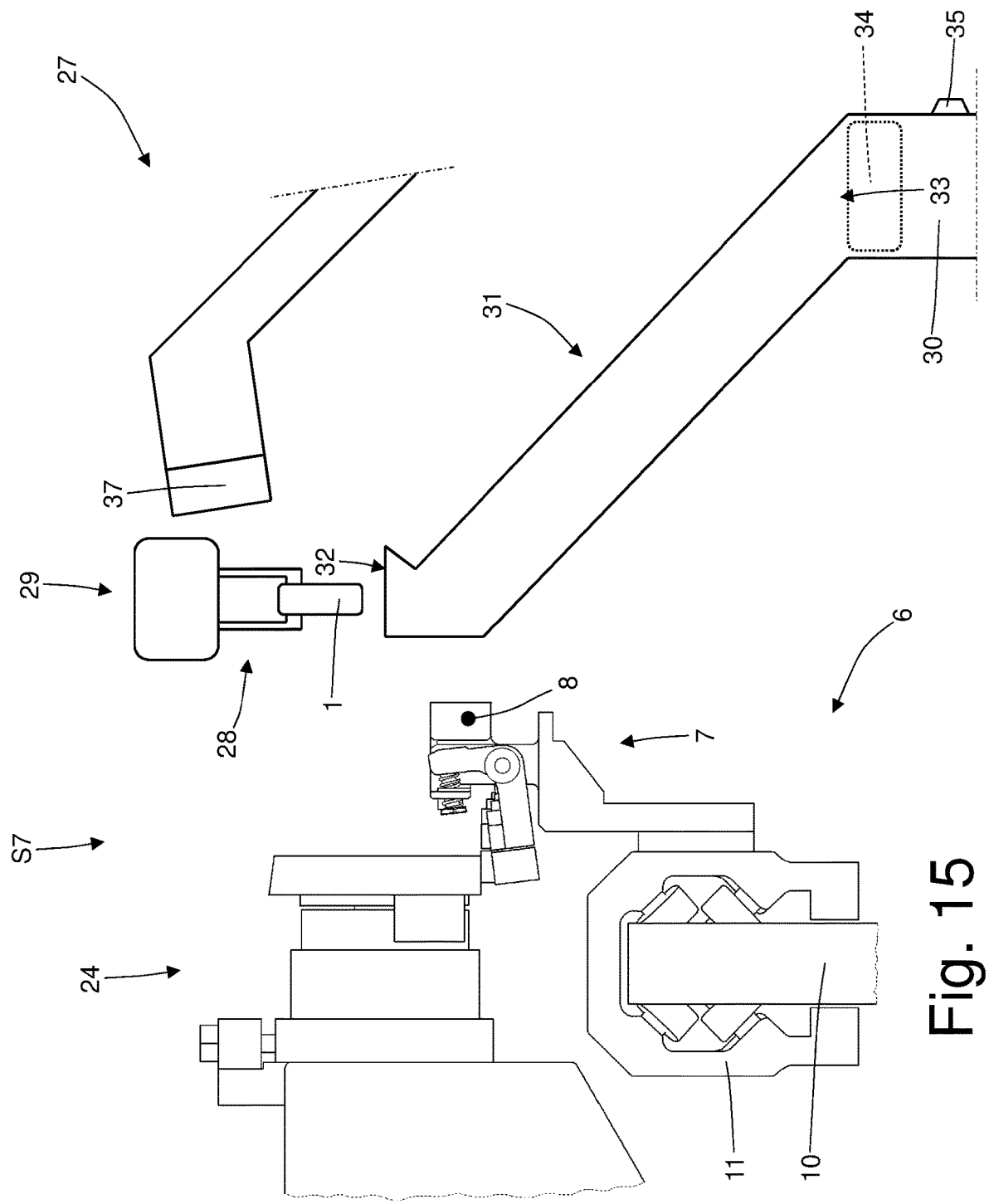

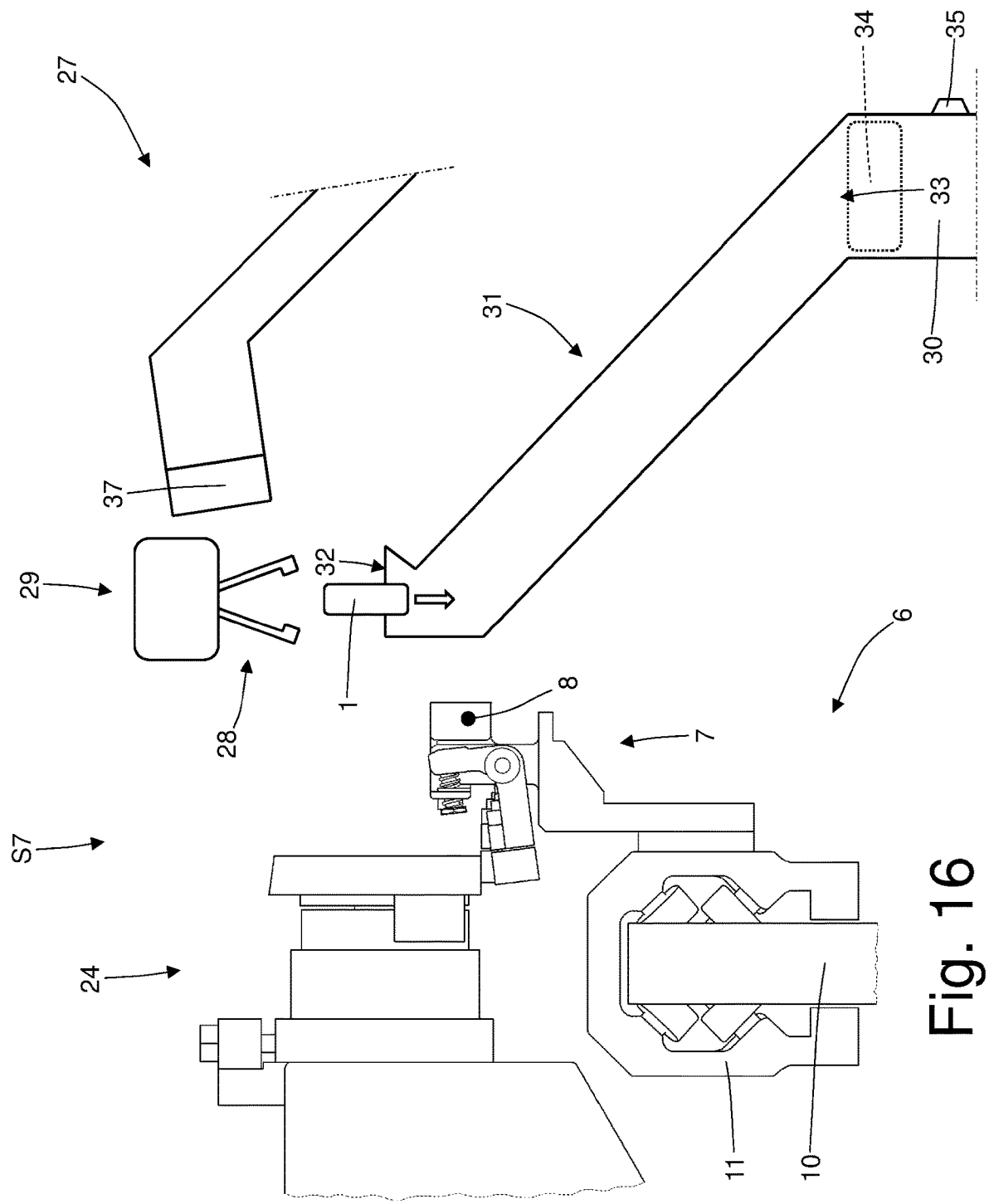

TRANSPORT SYSTEM FOR AN AT LEAST PARTIALLY COMPLETE CARTRIDGE, IN PARTICULAR FOR AN ELECTRONIC CIGARETTE

CROSS-REFERENCE TO RELATED APPLICATIONS

This patent application is a U.S. national phase of International Patent Application No. PCT/IB2020/055538 filed Jun. 12, 2020, which claims the benefit of priority from Italian patent application no. 102019000008817 filed on Jun. 13, 2019, the respective disclosures of which are each incorporated herein by reference in their entireties.

TECHNICAL FIELD

The present invention relates to a transport system for an at least partially complete cartridge, i.e. for a cartridge that can be fully complete or missing one or more elements.

The present invention finds advantageous application in the production of a cartridge for an electronic cigarette, to which the following disclosure will make explicit reference without thereby losing its generality.

PRIOR ART

A packaging machine for cartridges for an electronic cigarette comprises a transport system which is designed to move the cartridges for an electronic cigarette along a processing path and through a series of processing stations in which processing is carried out (e.g. element additions, welding, weighing, optical or electrical controls, folding . . . ) on the cartridges for an electronic cigarette.

The transport system must be able to hold the more or less complete cartridges for an electronic cigarette in a delicate way (so as to not damage the same) and, at the same time, sufficiently firm to ensure that the cartridges for an electronic cigarette are not lost (or, in any case, are not subject to unwanted shifting) during movement. In particular, to allow the packaging machine to reach high hourly productivity (for example of the order of several hundred cartridges for an electronic cigarette produced per minute) it is necessary to impart relatively high acceleration and deceleration to the cartridges for an electronic cigarette which therefore require a firm and secure control of the position of the cartridges for an electronic cigarette within the transport system.

An extraction station is normally coupled to the transport system in which an extraction device is arranged that is designed to extract a cartridge from the transport system because the cartridge has been identified as defective (and, hence, to be removed from the production cycle to be discarded) or to perform random checks. When cartridges full of liquid but not (yet) capped are provided, proceeding with the extraction can lead to an unwanted contamination of parts of the packaging machine if the movement of the cartridges following extraction causes an (unwanted and involuntary) liquid spillage. When the cartridges have a shape that allows them to remain in a vertical position (i.e. to "stand up") by themselves, it is possible to proceed by simply pushing a cartridge to be extracted from the production flow so as to collect said cartridge in an underlying collecting device. However, when the cartridges have a shape that does not allow them to remain in a vertical position (i.e. to "stand up"), it is very difficult to extract said cartridges without spillage onto the packaging machine.

Patent application US2015223522A1 describes a method for assembling cartridges for smoking devices and in particular for aerosol dispensing devices; the cartridges are assembled by transporting trolleys between various substations where the parts are added to a base.

DESCRIPTION OF THE INVENTION

The object of the present invention is to provide a transport system for an at least partially complete cartridge, in particular for an electronic cigarette, which machine transport system allows to reach high hourly productivity and is, at the same time, easy and inexpensive to manufacture.

According to the present invention, a transport system is provided for an at least partially complete cartridge, in particular for an electronic cigarette, according to what is claimed in the attached claims.

The claims describe embodiments of the present invention forming an integral part of the present description.

BRIEF DESCRIPTION OF THE DRAWINGS

The present invention will now be described with reference to the attached drawings, which illustrate a non-limiting example of embodiment, wherein:

FIGS. 10-16 are respective side and schematic views of the extraction station of FIG. 8 during different operational steps.

PREFERRED EMBODIMENTS OF THE INVENTION

Figure 1:
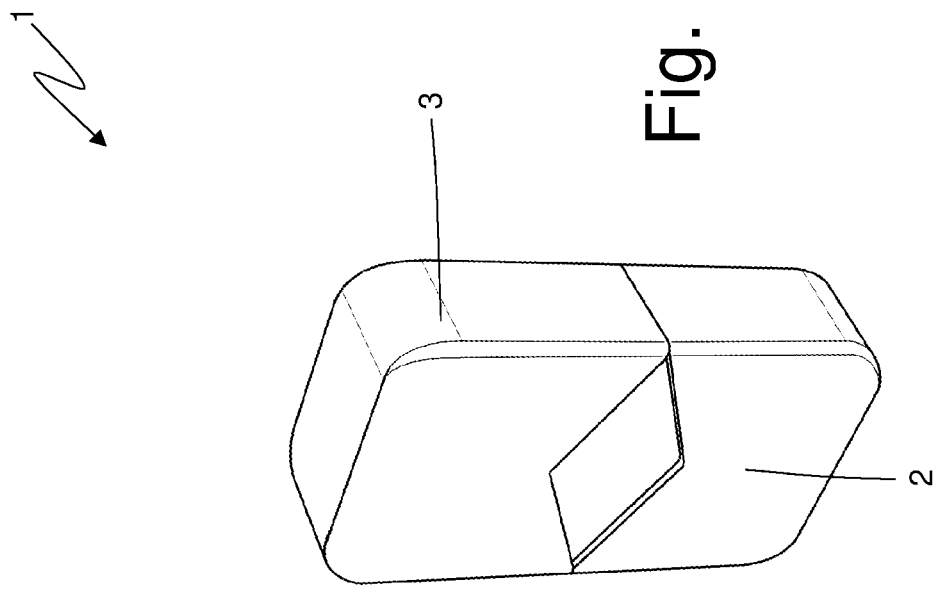
FIG. 1 is a perspective view of cartridge for an electronic cigarette.
Figure 2:
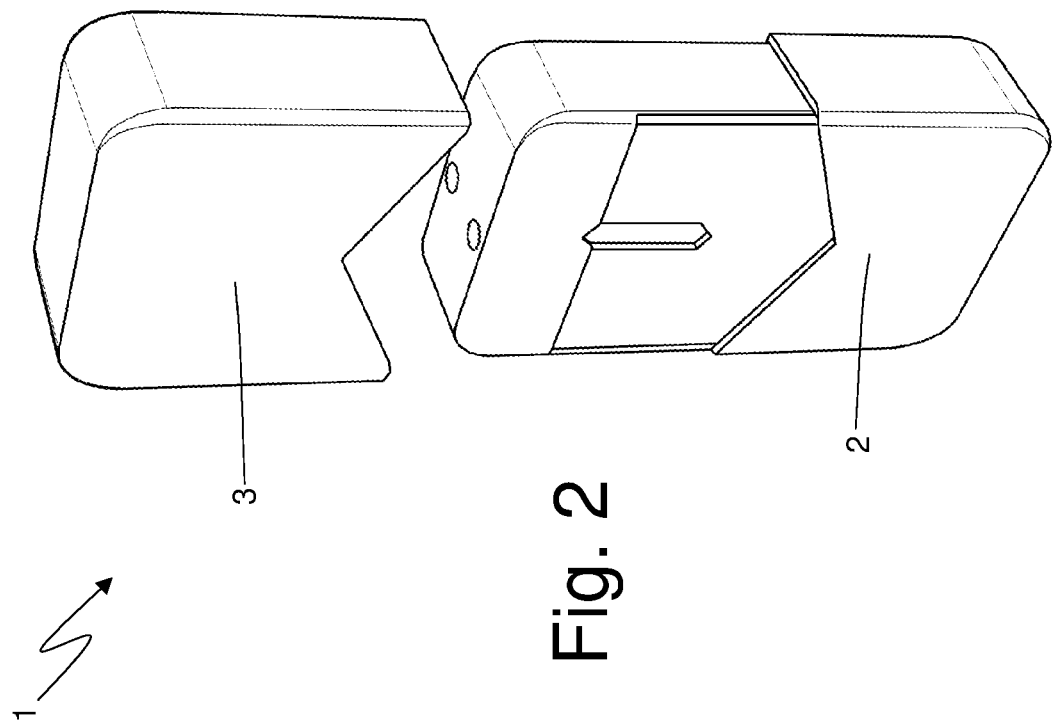
FIG. 2 is a perspective view of the cartridge of FIG. 1 with the removal of a removable cap.

In FIGS. 1 and 2, number 1 denotes as a whole a single use cartridge (i.e. disposable which is therefore used only once and is then replaced) of a known type, for an electronic cigarette.

The electronic cigarette comprises a reusable part having a parallelepiped shape that is used several times and contains, among other things, an electric battery (which provides the energy necessary for the functioning of the electronic cigarette) and an electronic processor that oversees the functioning of the electronic cigarette; a new disposable cartridge 1 is coupled to the reusable part to be used (i.e. to be "smoked") and is thrown away after use to be replaced with a new disposable cartridge 1.

The cartridge 1 comprises a main body 2 having a substantially parallelepiped shape which, in use, is coupled to an electronic cigarette from which it receives power supply through two electrical contacts arranged in the area of a smaller base of the main body. Furthermore, the cartridge 1 comprises a cap 3 which fits on the main body 2 to cover the area in which the two electrical contacts are arranged.

Figure 3:
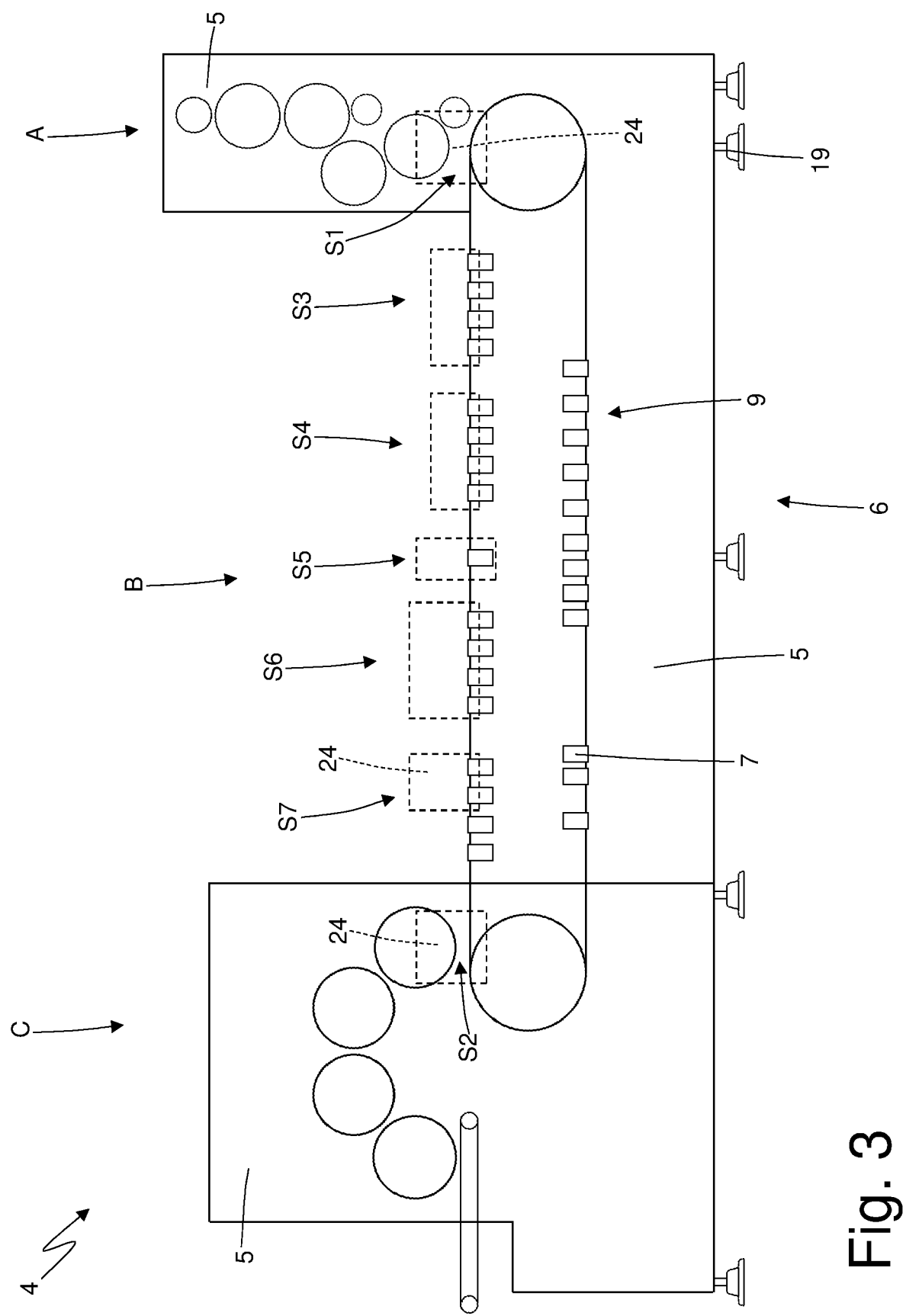
FIG. 3 is a front and schematic view of a packaging machine for the production of the cartridge of FIG. 1 provided with a transport system made according to the present invention.

In FIG. 3, number 4 denotes as a whole a packaging machine for the production of the cartridges 1 for an electronic cigarette described above.

The packaging machine 4 comprises an assembly section in which the materials forming the cartridges 1 for an electronic cigarette are assembled to process the cartridges 1 for an electronic cigarette and a feeding section, in which the materials forming the cartridges 1 for an electronic cigarette are received and directed towards the assembly section.

As illustrated in FIG. 3, the assembly section of the packaging machine 4 comprises an initial part A, an intermediate part B, and a final part C.

The packaging machine 4 comprises a support body 5 (i.e. a frame) which rests on the ground by means of legs and has a front vertical wall on which the operating members of the three parts A, B and C are mounted. The intermediate part B of the packaging machine 4 comprises a transport system 6 which moves the partially complete cartridges for an electronic cigarette (i.e. still devoid of some elements) along a processing path P (illustrated in FIG. 4) which extends between an inlet station S1 and an outlet station S2. The transport system 6 comprises a plurality of movable equipment 7 in each two seats 8 (illustrated in FIGS. 4-7) are provided each suitable for housing a partially complete cartridge (i.e. still devoid of some elements) in a stable and precise position. According to other embodiments not illustrated, each piece of movable equipment 7 has a different number of seats 8 (generally from a minimum of one seat 8 seats to a maximum of six/eight seats 8). The transport system 6 comprises a conveyor 9 to cyclically move each piece of movable equipment 7 along an annular processing path P with intermittent (at step) movement which provides for cyclical alternation of motion steps, in which the conveyor 9 moves the movable equipment 7 and stopping steps, in which the conveyor 9 keeps the movable equipment 7 stationary.

The processing path P comprises a straight operating section which extends from an inlet station S1 (which forms the end of the initial part A and the beginning of the intermediate part B) in which the partially complete cartridges 1 for an electronic cigarette are cyclically fed to the seats 8 of the movable equipment 7 to an outlet station S2 (which forms the end of the intermediate part B and the beginning of the final part C) in which the partially complete cartridges 1 for an electronic cigarette (to which elements have been added by crossing the intermediate part B) leave the seats 8 of the movable equipment 7. Furthermore, as illustrated in FIG. 3, the working path P comprises a straight return section parallel and opposite to the straight operating section and two semi-circular connecting sections which connect the operating section and the return section to one another.

As illustrated in FIG. 3, the conveyor 9 comprises an annular guide 10 (i.e. closed in a ring on itself) which is arranged in a fixed position along the processing path P; in particular, the annular guide 10 is formed by a single fixed track (i.e. without movement) which is arranged along the processing path P. Furthermore, the conveyor 9 comprises a plurality of slides 11, each of which supports a corresponding movable equipment 7 and is coupled to the guide 10 to slide freely along the guide 10. Finally, the conveyor 9 comprises a linear electric motor 12 which moves the slides 11 carrying the movable equipment 7 along the processing path P; the linear electric motor 12 comprises an annular stator 13 (i.e. a fixed primary) which is arranged in a fixed position along the guide 10 and a plurality of movable sliders (i.e. movable secondaries), each of which is electromagnetically coupled to the stator 13 to receive a driving force from the stator 13 and is rigidly connected to a corresponding slide 11.

According to a different embodiment not illustrated, the conveyor 9 is a belt conveyor and comprises (at least) a flexible belt which supports the movable equipment 7 and is closed in a ring around two end pulleys (at least one of which is motorized).

As illustrated in FIG. 3, along the processing path P (i.e. between the inlet station S1 and the outlet station S2) are arranged in succession (i.e. one after the other) processing stations S3-S6 in which processing is carried out (e.g. additions of elements, welding, weighing, optical or electrical controls, folding . . . ) on the partially complete cartridges 1 for an electronic cigarette carried by the seats 8 of the movable equipment 7. Furthermore, along the processing path P and immediately upstream of the outlet station S2 (i.e. between the processing station S6 and the outlet station S2) an extraction station S7 is provided, in which an extraction device is arranged (better described hereinafter) designed to extract from (at least) a corresponding seat 8 of a piece of movable equipment 7 a corresponding partially complete cartridge 1.

Figure 6:
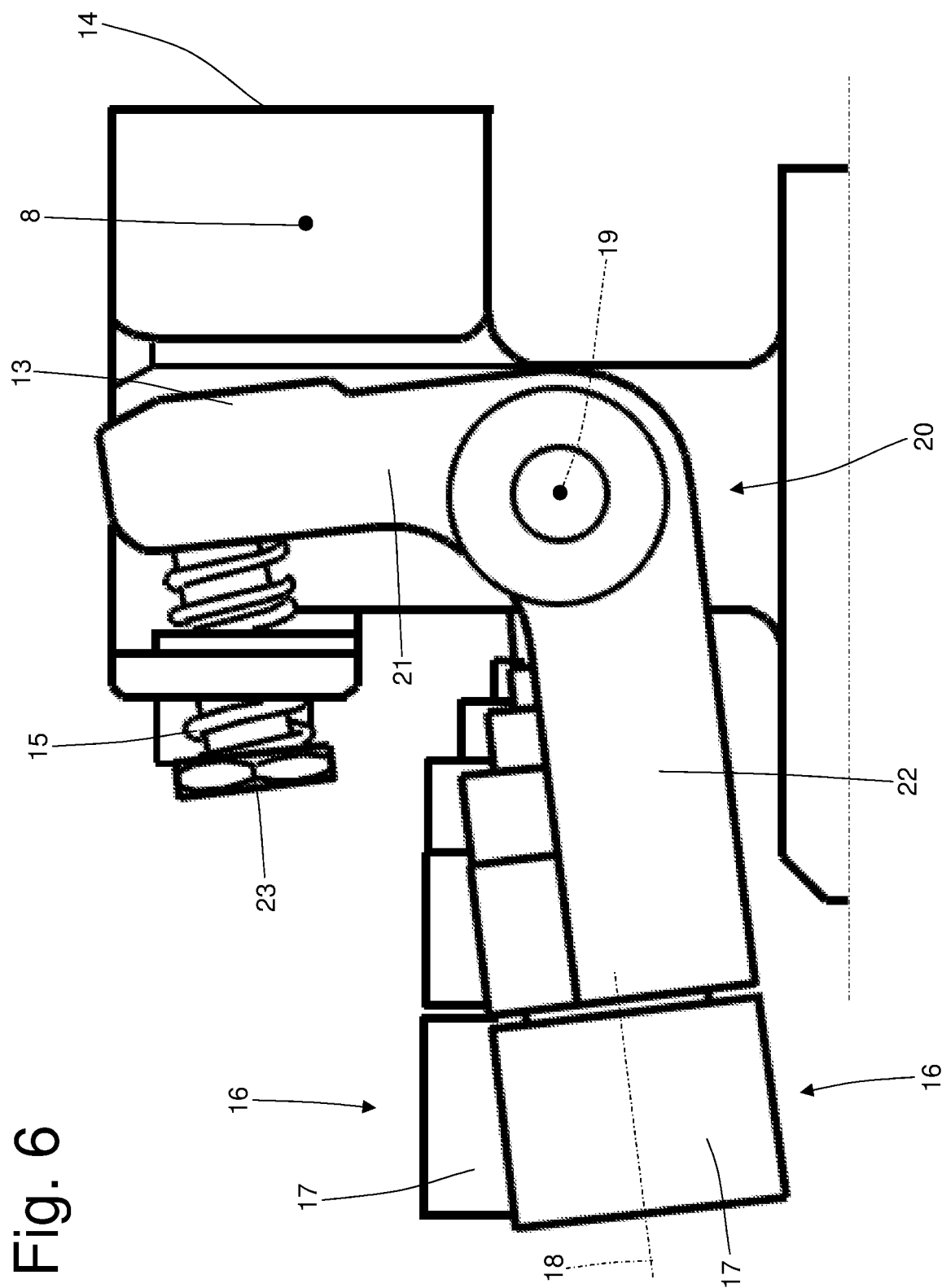
FIG. 6 is an enlarged view of a detail of FIG. 5.

As better illustrated in FIG. 6, each seat 8 is delimited by a movable wall 13 and by a fixed wall 14 facing and opposite one another so that the cartridge 1 for an electronic cigarette can be housed between the movable wall 13 and the fixed wall 14; i.e. when a cartridge 1 for an electronic cigarette is inserted in a corresponding seat 8 it is located between the movable wall 13 and the fixed wall 14. The movable wall 13 of each seat 8 is movably mounted on the movable equipment 7 to move away from and closer to the fixed wall 14 between a holding position, in which the movable wall 13 is at a minimum distance from the fixed wall 14 (and, hence, presses, gently, the cartridge 1 for an electronic cigarette against the fixed wall 14) and a release position, in which the movable wall 13 is at a maximum distance from the fixed wall 14 (and, hence, allows the cartridge 1 for an electronic cigarette to enter or exit into/from the seat 8 effortlessly and without scraping against the walls 13 and 14). In other words, the walls 13 and 14 of each seat 8 form the two jaws of a pincer which is designed to close around a cartridge 1 for an electronic cigarette to tighten, and, hence, house, the cartridge 1 for an electronic cigarette.

According to a different embodiment not illustrated, in each seat 8 both walls 13 and 14 are movable, i.e. they are movably mounted on the corresponding movable equipment 7.

As better illustrated in FIG. 6, the movable equipment 7 comprises, for each seat 8, an elastic element 15 which pushes the movable wall 13 towards the fixed wall 14 and, hence, towards the holding position with a predetermined and calibrated elastic force so as to ensure that a cartridge 1 for an electronic cigarette is kept inside the seat 8 without, at the same time, damaging the cartridge 1 for an electronic cigarette.

As better illustrated in FIG. 6, the movable equipment 7 comprises a control appendage 16 which is mechanically connected to the movable wall 13, is movable so as to remove the movable wall 13 from the fixed wall 14 and then move the movable wall 13 towards the release position, and is designed to be moved (in the manner described in the following) from the outside of the movable equipment 7 (i.e. from the outside of the conveyor 9). According to a preferred embodiment, each control appendage 16 ends with an idle roller 17 that rotates freely around a rotation axis 18 which is perpendicular to the processing path P followed by the movable equipment 7.

As better illustrated in FIG. 6, each movable wall 13 is rotatably mounted on the movable equipment 7 to rotate about a rotation axis 19 which is parallel to the processing path P followed by the movable equipment 7 and perpendicular to the rotation axis 18 of the corresponding idle roller 17. According to a preferred embodiment, each piece of movable equipment 7 comprises, for each seat 8, a rocker arm 20 which is centrally hinged so as to rotate about the rotation axis 19 and has an arm 21 which forms the movable wall 13 and an arm 22 which forms the control appendage 16; in other words, in each rocker 20 the two arms 21 and 22 are divided from one another by the rotation axis 19 (therefore the rotation axis 19 is arranged between the two arms 21 and 22).

As better illustrated in FIG. 6, each elastic element 15 is formed by a coil spring compressed between a fixed abutment 23 of the movable equipment 7 and the arm 21 of a corresponding rocker arm 20 on an opposite part of the seat 8. Preferably, each fixed abutment 23 of a movable equipment 7 is formed by a screw which is screwed onto the movable equipment 7 and can be screwed/unscrewed to adjust the compression of the coil spring so as to adjust the elastic force generated by the coil spring.

As illustrated in FIG. 3, the transport system 6 comprises three operating devices 24 (schematically illustrated) which are arranged, respectively, in the inlet station S1 (in which it is necessary to "open" all the seats 8 of the movable equipment 7 to allow the insertion of the cartridges 1 for an electronic cigarette inside the seats 8), in the outlet station S2 (where it is necessary to "open" all the seats 8 of the movable equipment 7 to allow the removal of the cartridges 1 for an electronic cigarette from the seats 8), and in the extraction station S7 (in which it is occasionally necessary to open a single seat 8 of a movable equipment 7 to allow the removal of the corresponding cartridge 1 for an electronic cigarette which must be discarded, i.e. removed from the processing path P).

Each operating device 24 is external and independent from the movable equipment 7, is arranged in a fixed position along the processing path P, and is designed to act on the control appendages 16 of the movable equipment 7 to move (temporarily) the corresponding movable walls 13 from the holding position to the release position by compressing the corresponding elastic elements 15.

Each operating device 24 comprises a control member 25 (illustrated for example in FIGS. 4, 5 and 7) which has the function of a cam and is designed to touch and move each control appendage 16 when the movable equipment 7 is in the area of the operating device 24. In the operating devices 24 arranged in stations S1 and S2, the respective control members 25 are arranged in a fixed position (i.e. they are able to act always upon the control appendages 16 of the movable equipment 7) since in stations S1 and S2 it is always and in any case necessary to insert the cartridges 1 for an electronic cigarette inside the seats 8 (inlet station S1) or to pick-up the cartridges 1 for an electronic cigarette from the seats 8 (outlet station S2). In the operating device 24 arranged in the extraction station S7 and illustrated in FIGS. 4, 5 and 7, each control member 25 is movable between an inert (resting) position, in which it does not touch the control appendage 16 when the movable equipment 7 is arranged in the area of the operating device 24 and an operating position, in which it touches and moves the control appendage 16 when the movable equipment 7 is in the area of the operating device 24. In other words, in the extraction station S7 only a small part of the cartridges 1 for an electronic cigarette must be extracted from the corresponding seats 8 of the movable equipment 7 and, hence, the operating device 24 arranged in the extraction station S7 must be able to "open" only the seats 8 of the movable equipment 7 containing cartridges 1 for an electronic cigarette to be discarded without "opening" all the other seats 8 of the movable equipment 7 containing cartridges 1 for an electronic cigarette that are not to be discarded. Consequently, the control member 25 of an operating device 24 located in the extraction station S7 must be movable between the inert position, in which it does not touch the control appendage 16 (to be assumed when a seat 8 containing a cartridge 1 for an electronic cigarette not to be discarded passes through) and the operating position, in which it touches and moves the control appendage 16 (to be assumed when a seat 8 containing a cartridge 1 for an electronic cigarette to be discarded passes through).

Figure 4:
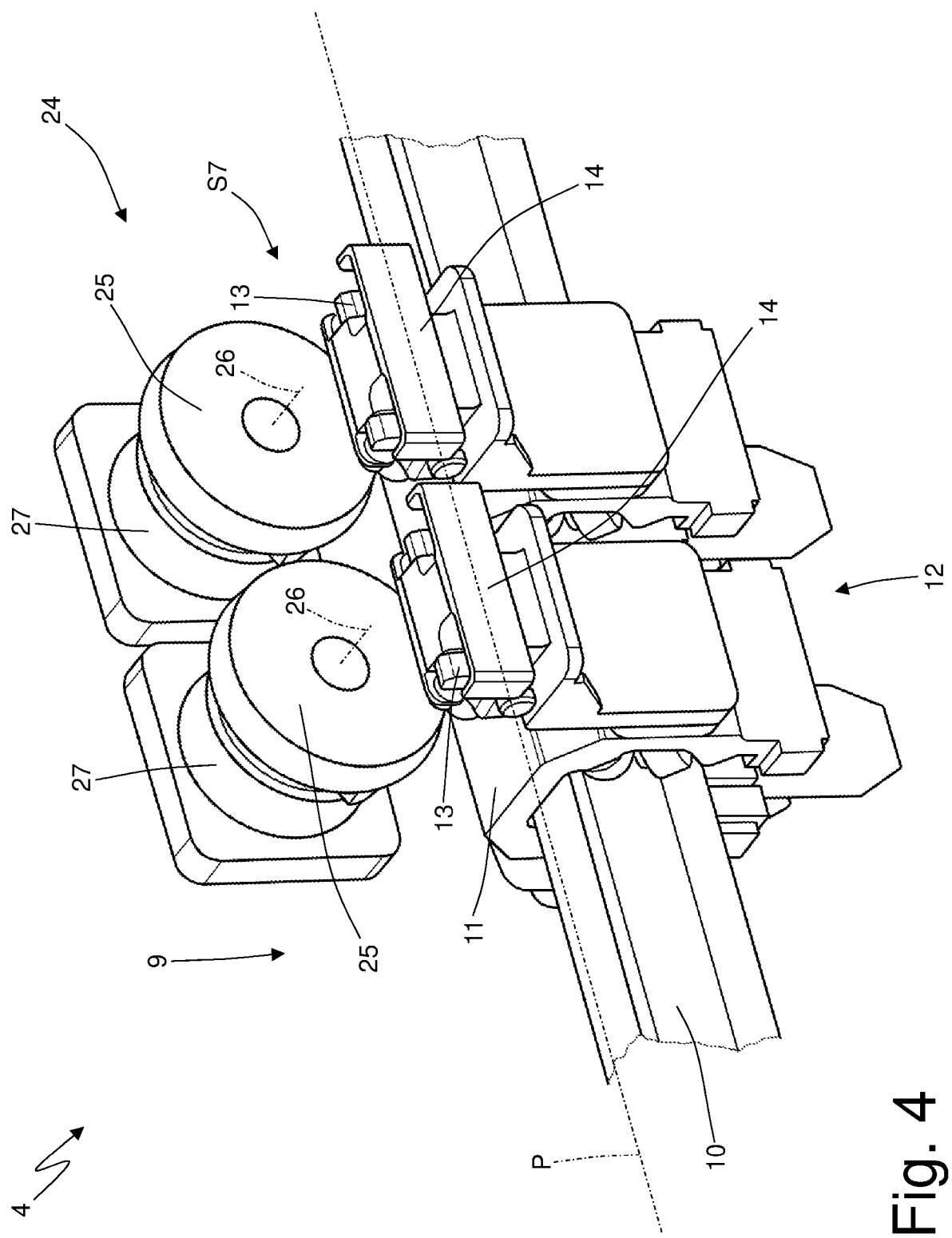
FIG. 4 is a perspective and schematic view of part of the transport system of the packaging machine of FIG. 4.
Figure 5:
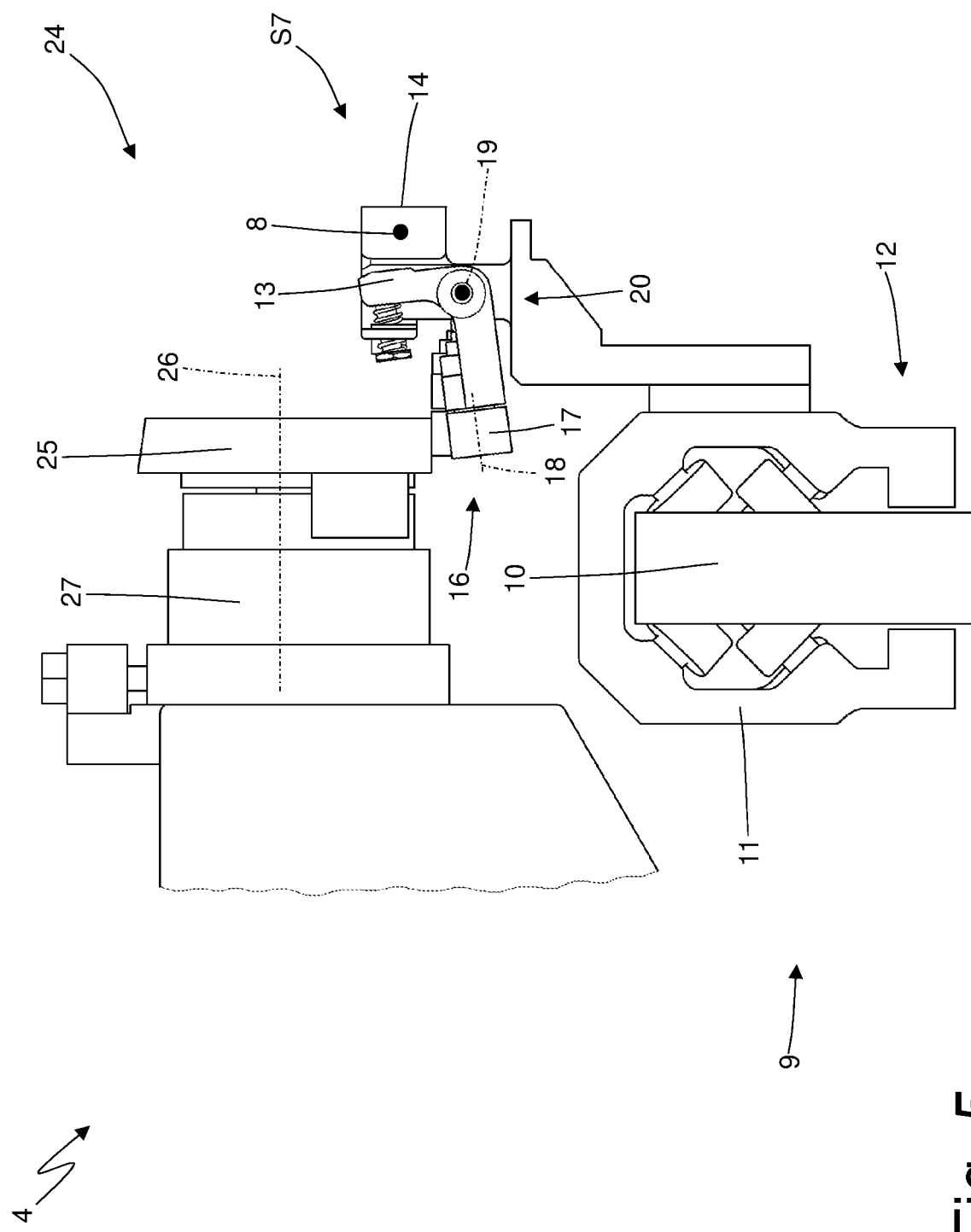
FIG. 5 is a side view of the transport system of FIG. 4.
Figure 7:
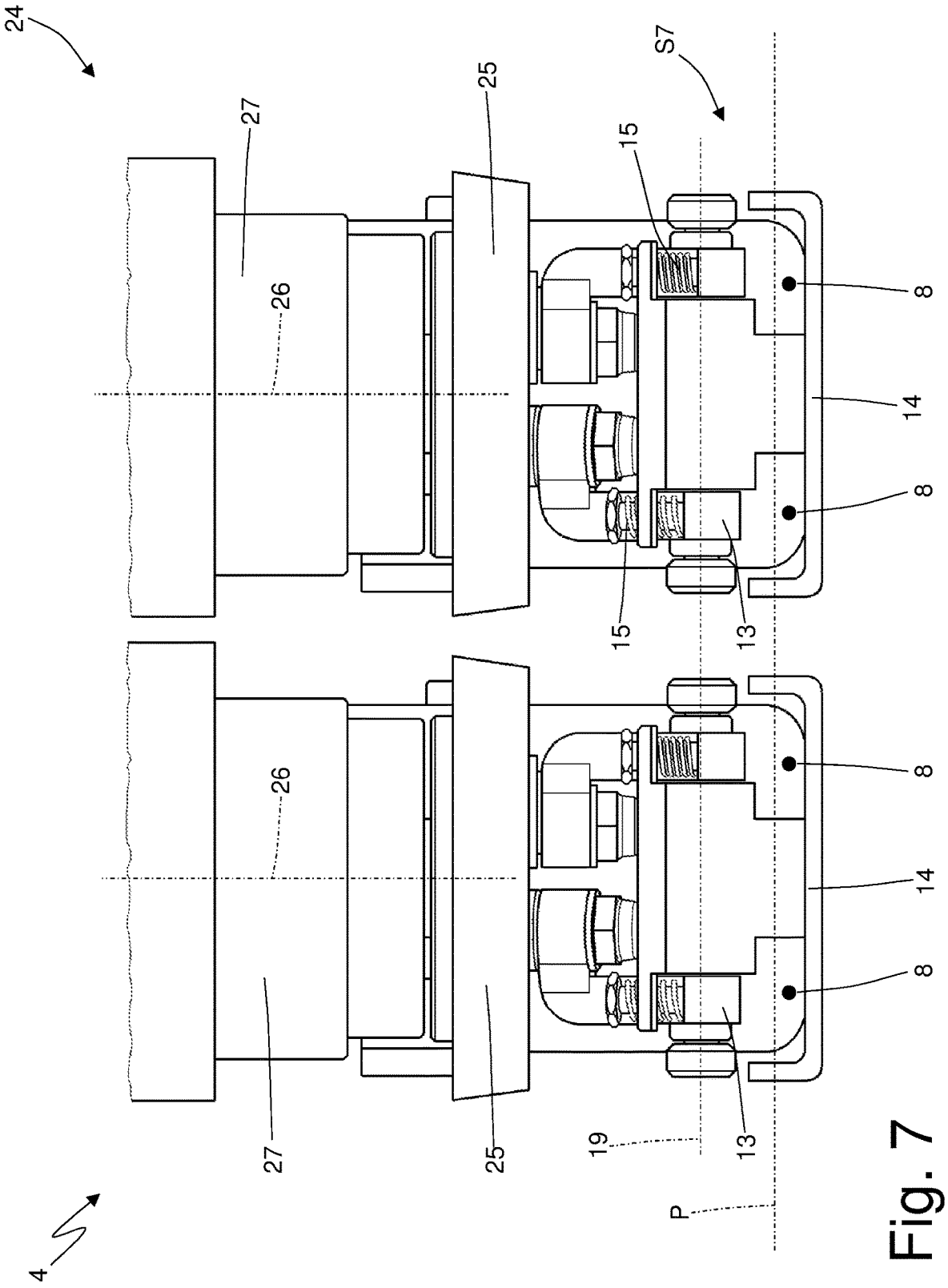
FIG. 7 is a plan view of the transport system of FIG. 4.

According to a preferred embodiment illustrated in FIGS. 4, 5 and 7, each control member 25 is mounted rotatably about a rotation axis 26 so as to rotate between the inert position and the operating position; each rotation axis 26 of a control member 25 is perpendicular to the processing path P followed by the movable equipment 7 and is (substantially) parallel to the rotation axis 18 of each idle roller 17.

According to a possible embodiment, each control member 25 is mounted eccentric relative to the rotation axis 26 so that by rotating around the rotation axis 26 it can modify its radial dimensions at the area where the control appendages 16 are located. According to an alternative embodiment, each control member 25 has a side surface which is suitable for coming in contact with a control appendage 16 and is arranged at a radial distance variable from the rotation axis 26.

The "opening" of the seats 8 can also take place by means of operating devices 24 shaped differently (for example provided with levers or hammers which act upon the control appendages 16) but the control member 25 operating as a cam minimizes the consequences of a violent impact against the idle rollers 17 in the event of the system being out of step (i.e. if, due to a control error, the control member 25 is not in the inert position when the movable equipment 7 arrives).

In the embodiment illustrated in FIGS. 4, 5 and 7, each piece of movable equipment 7 is provided with two seats 8 which are arranged one next to the other and one following the other relative to a moving direction of the movable equipment 7 along the processing path P and the extraction station S7 comprises two operating devices 24 which are arranged beside one another and are each designed to act upon the control appendage 16 (therefore on the movable wall 13) of a corresponding seat 8 of the same movable equipment 7. So when a/the movable equipment 7 is standing still in the extraction station S7 it is possible to operate only the right operating device 24 to discard only the cartridge 1 for an electronic cigarette which is housed in the seat 8 on the right, it is possible to operate only the operating device 24 on the left to discard only the cartridge 1 for an electronic cigarette which is housed in the seat 8 on the left, or it is possible to operate both operating devices 24 on the left to discard both cartridges 1 for an electronic cigarette which are housed in both seats 8.

Once a seat 8 has been "opened" in the extraction station S7, the cartridge 1 for an electronic cigarette contained in the seat 8 can be extracted from the seat 8 by gravity (i.e. it falls downwards and is no longer held by the movable wall 13 which pushes it against the fixed wall 14) or can be extracted from the seat 8 by means of an extraction device that picks up and lifts the cartridge 1 for an electronic cigarette from above.

It is important that in the extraction station S7, some cartridges 1 for an electronic cigarette can be extracted from the corresponding seats 8 because the cartridges 1 for an electronic cigarette are defective, or to make a sample check of the production, or for any other reason related to the production of cartridges 1 for an electronic cigarette.

Figure 8:
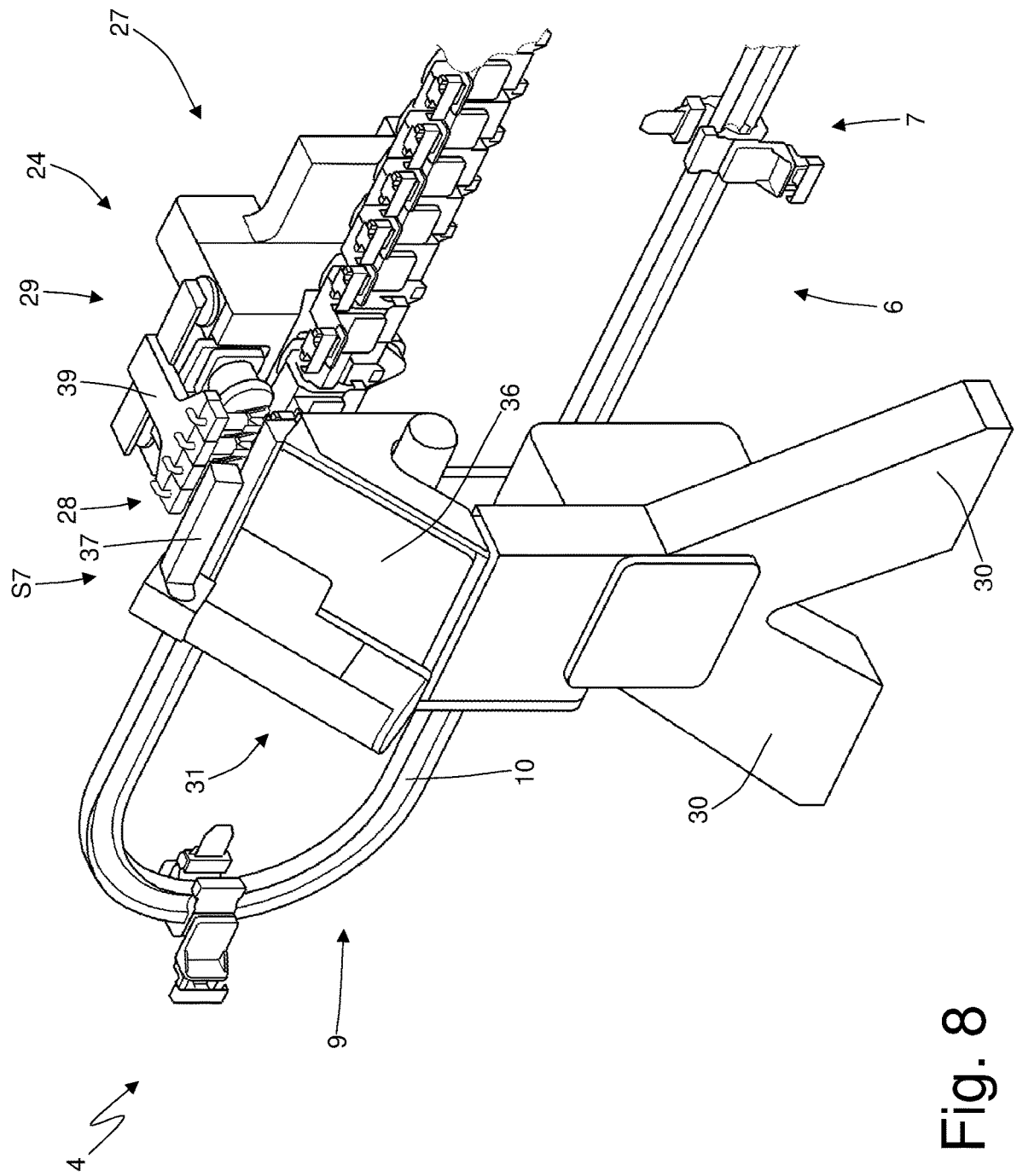
FIG. 8 is a perspective and schematic view of an extraction station arranged along the transport system of FIG. 4.
Figure 9:
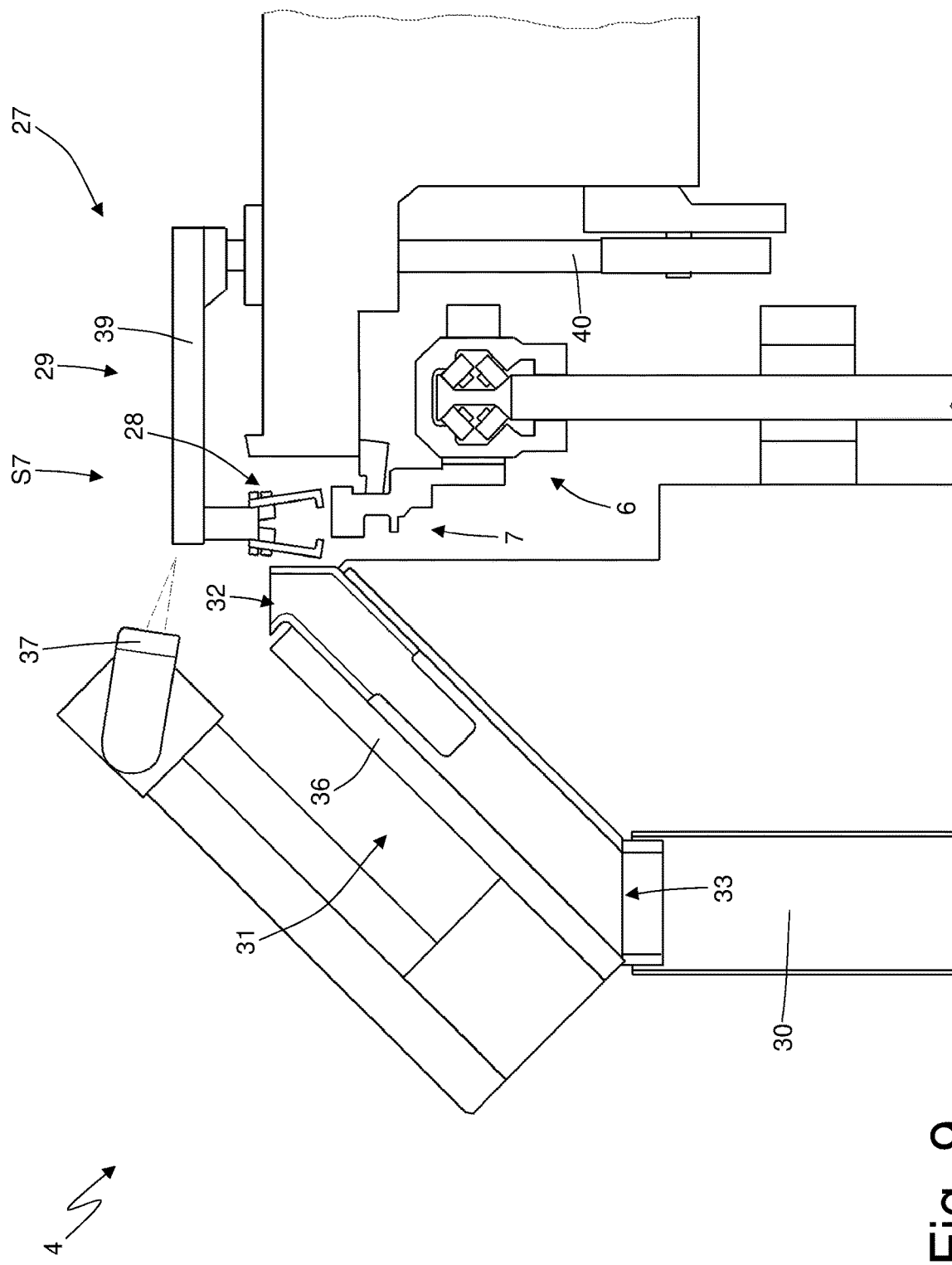
FIG. 9 is a side and schematic view of the extraction station of FIG. 8.
Figure 10:
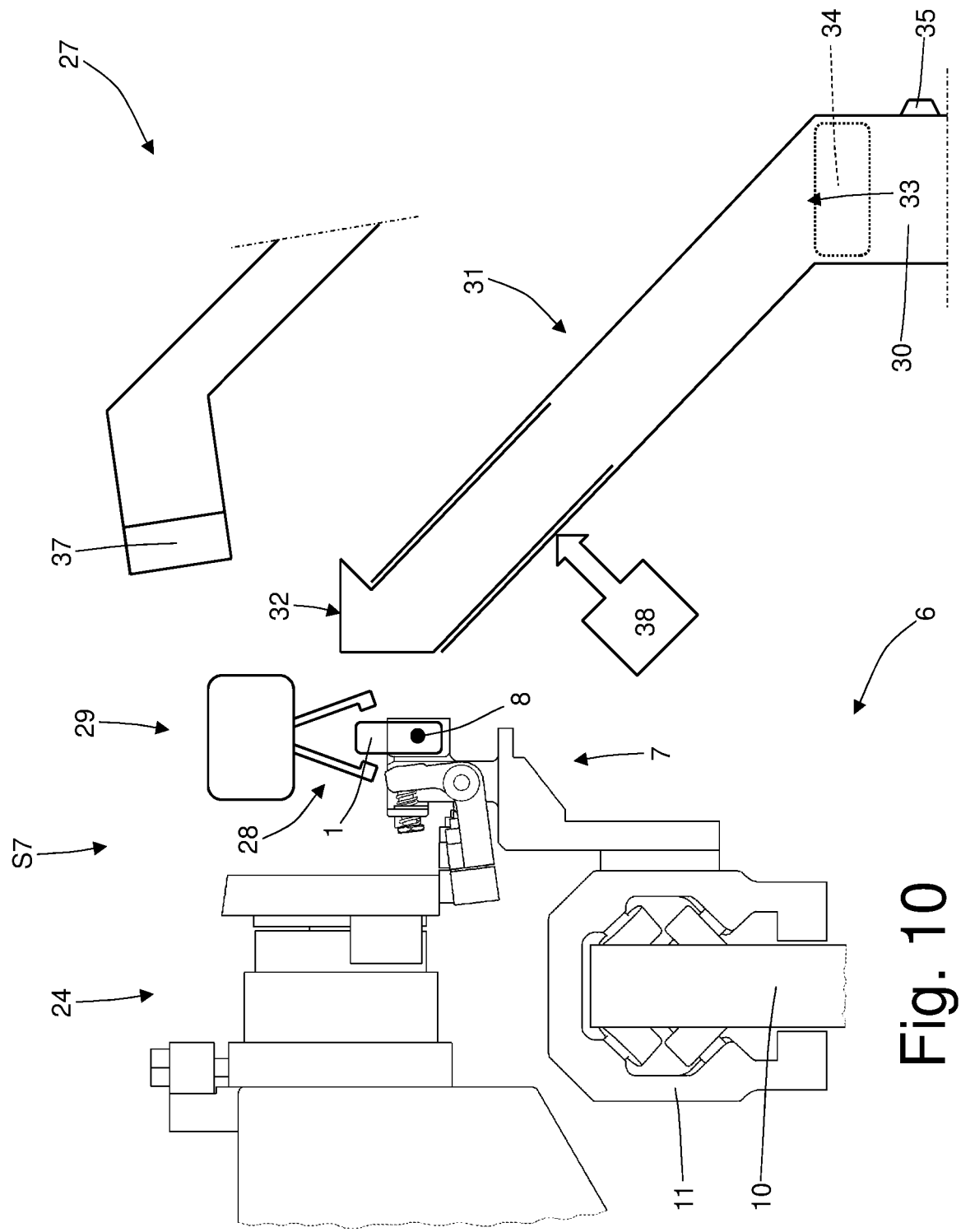
Figure 11:
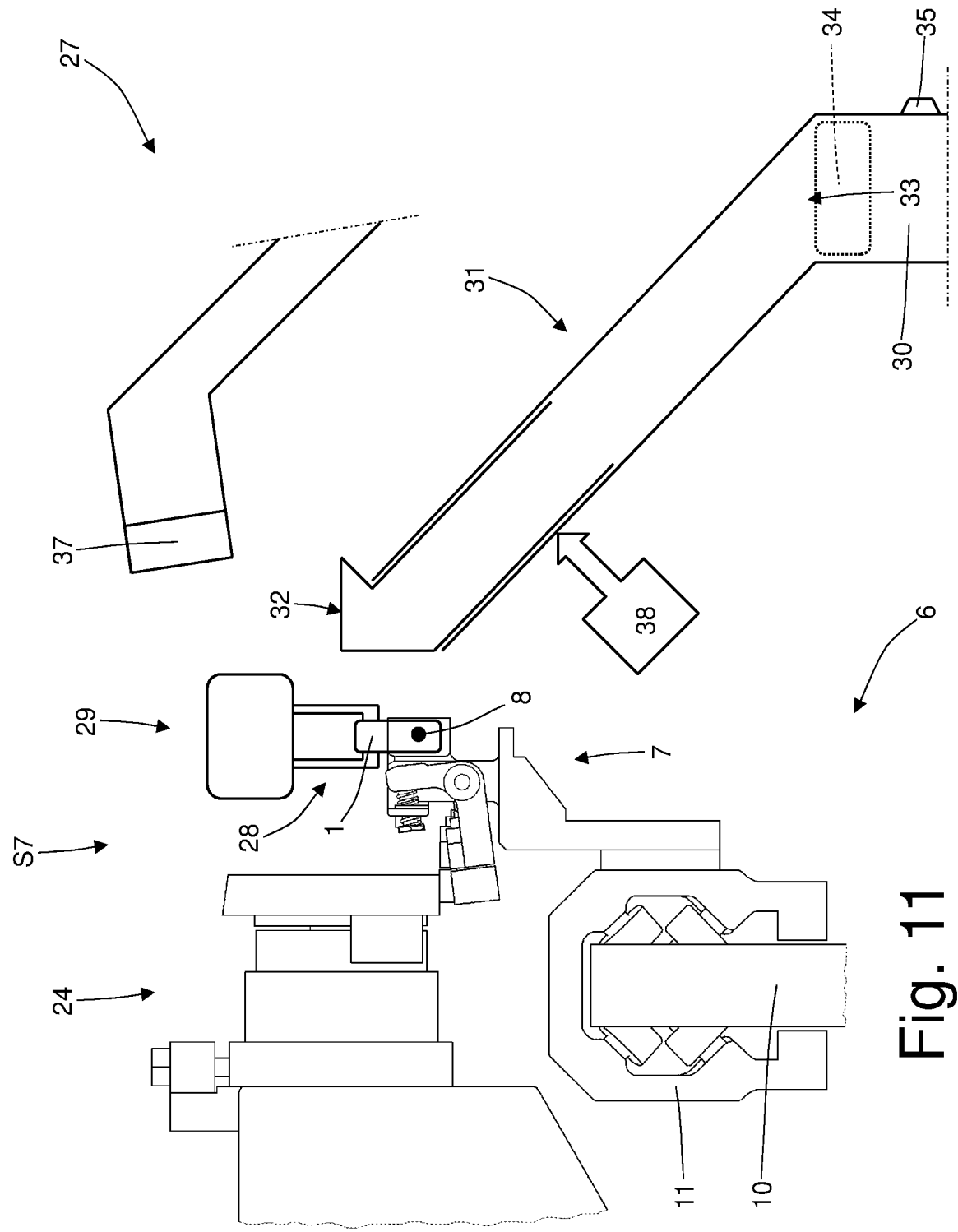

As illustrated in FIGS. 8, 9 and 10, the extraction station S7 comprises a collecting device 27, which is designed to receive and contain the cartridges 1 for an electronic cigarette that are extracted in the extraction station S7.

In addition, the extraction station S7 comprises four holding heads 28 (partially shown in FIG. 8 while a single holding head 28 is illustrated in FIGS. 9-16) which are arranged side by side; each holding head 28 is designed to grab (and firmly hold) one end of cartridge for an electronic cigarette 1 which protrudes from a corresponding seat 8 (i.e. which is left free by a corresponding seat 8). According to other embodiments not illustrated, a different number of holding heads 28 are provided side by side: e.g. a single holding head 28, two holding heads side by side, three holding heads 28 side by side, five holding heads 28 side by side . . . .

In the preferred embodiment illustrated in the attached Figures, each holding head 28 comprises a pincer provided with two opposing jaws which are movable for approaching one another and, hence, gripping one end of a cartridge 1 for an electronic cigarette or to move away from one another thus releasing the end of the cartridge 1 for an electronic cigarette; the movement of the two opposing jaws of a holding head 28 could be controlled by a dedicated (electric or pneumatic) actuator. According to a preferred embodiment, the four holding heads 28 can be controlled singularly independent from one another; i.e. each holding head 28 has its own dedicated actuator which controls its jaws independent from the other holding heads 28. According to other embodiments not illustrated, each holding head 28 comprises a different gripping system instead of the pincer provided with two opposing jaws, for example a suction pad or an electromagnet (obviously only in the case of cartridges 1 for an electronic cigarette provided with ferromagnetic metal parts).

The extraction station S7 comprises a moving device 29 which supports the four holding heads 28 and moves the holding head 28 between a pick-up position where the holding head 28 is in the area of the transport system 6 and grabs the cartridge 1 for an electronic cigarette, and a release position, in which the holding head 28 releases the cartridge 1 for an electronic cigarette in the collecting device 27. As previously stated, preferably the four holding heads 28 can be singularly controlled independent from one another, so that, when the holding heads 28 are all in the pick-up position a holding head can grab a corresponding cartridge 1 for an electronic cigarette while another holding head 28 may not grab a corresponding cartridge 1 for an electronic cigarette; in this way, it is not mandatory to extract all four cartridges 1 for an electronic cigarette which are in the area of the four holding heads 28 in the pick-up position, but it is possible to choose which cartridges 1 for an electronic cigarette to extract and which cartridges 1 for an electronic cigarette to not extract.

The collecting device 27 comprises a pair of twin containers 30 and a discharge duct 31 which is inclined downwards (i.e. forms a "slide" along which the cartridges 1 for an electronic cigarette slide downwards by gravity) and bifurcates to extend from a single inlet opening 32 arranged horizontally to two outlet openings 33, each being arranged in the area of a respective container 30. In other words, the discharge duct 31 has a single upper branch which starts with the inlet opening 32, two lower branches which end inside the containers 30 with their respective outlet openings 33, and an inverted "Y"-shaped bifurcation that connects the single upper branch to the two lower branches. In the area of the bifurcation of the discharge duct 31 a motorized deflector member 34 is provided (therefore remotely controllable) which is designed to assume two different positions in order to alternatively direct a cartridge 1 for an electronic cigarette into a container 30 or into the other container 30.

According to a preferred embodiment, a pair of sensors 35 are provided (only one of which is illustrated in FIGS. 10-16), each coupled to a corresponding container 30 and designed to determine both the presence of the corresponding container 30 (i.e. if the container 30 is present or absent), and the attainment of the filling of the corresponding container 30 (i.e. whether or not the container is completely full). For example, each sensor 35 could be of the optical type. Obviously, the motorized deflector member 34 is controlled according to the readings of the two sensors 35 to direct the cartridges 1 for an electronic cigarette which slide along the discharge duct 31 always and only in a container 30 present and not completely full. The presence of two twin containers 30 allows to empty/clean a container 30 (temporarily removing the container 30 from the collecting device 27) while the other container 30 is used.

According to a possible embodiment illustrated in FIG. 8, the discharge duct 31, which extends from an inlet opening 32 to the two outlet openings 33 is delimited by an inspection wall 36 which faces the opposite side of the transport system 6 (therefore it is visible from the outside of the packaging machine 4), it is transparent and is arranged above the bifurcation (i.e. between the inlet opening 32 and the bifurcation).

As previously mentioned, the inlet opening 32 of the discharge duct 31 is arranged horizontally so as to offer the maximum possible reception area to cartridge 1 for an electronic cigarette which is dropped from above by a holding head 28 which release (abandon) the cartridge 1 for an electronic cigarette; in other words, each holding head 28 is initially moved to the pick-up position in the area of the transport system 6 to pick-up a cartridge 1 for an electronic cigarette from a seat 8 and then is subsequently moved to the release position (in which the head 28 is located above the inlet opening 32 of the discharge duct 31) to release the cartridge 1 for an electronic cigarette which falls by gravity downwards entering the discharge duct 31 through the inlet opening 32 (before releasing the cartridge 1 for an electronic cigarette, the holding head 28 could be lowered to reduce the "free" fall distance of the cartridge 1 for an electronic cigarette).

Figure 12:
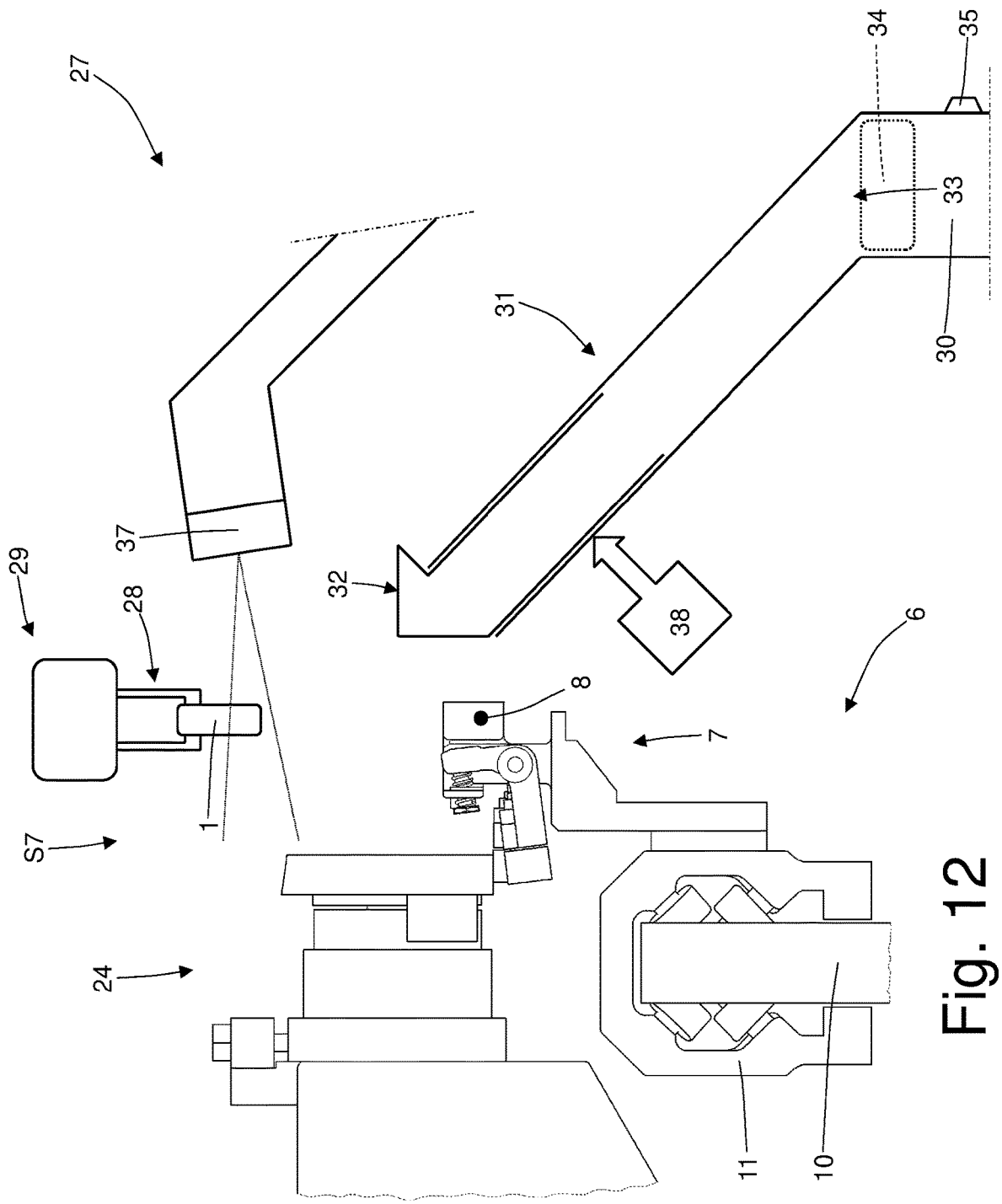

According to a preferred embodiment better illustrated in FIG. 12, the extraction station S7 comprises four sensors 37 (only one of which is illustrated in FIGS. 10-16), each arranged in a fixed position in front of the release position of the holding heads 28 and is designed to determine whether a corresponding holding head 28 arranged in the release position is actually grabbing a cartridge 1 for an electronic cigarette. The function of each sensor 37 is to verify whether the corresponding holding head 28 arranged in the release position is actually grabbing a cartridge 1 for an electronic cigarette and, hence, whether it has correctly picked-up the cartridge 1 for an electronic cigarette from the corresponding seat 8. For example, each sensor 37 could be of the optical type.

Figure 13:
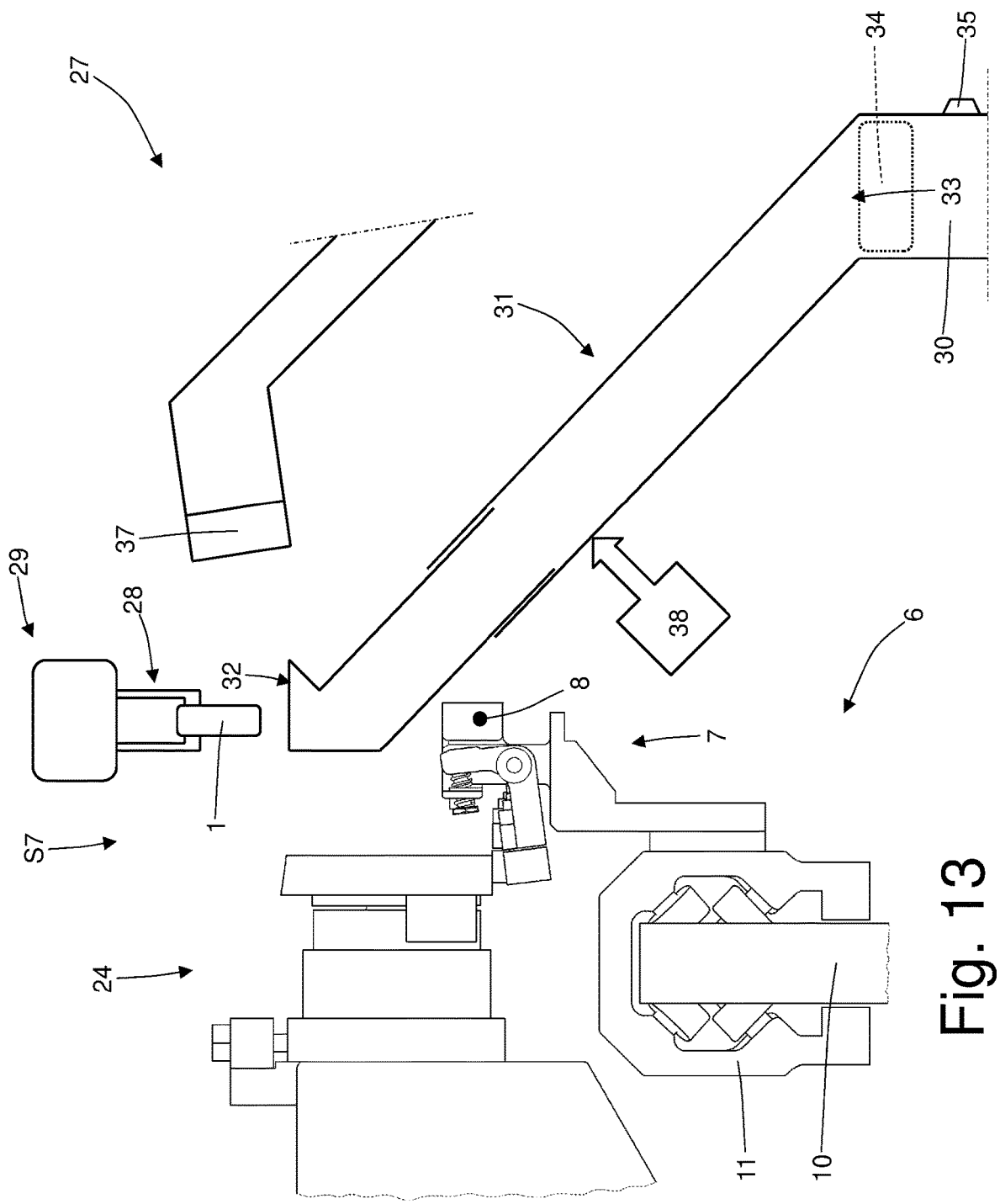

In the embodiment illustrated in the attached FIGS. 13 and 14, the collecting device 27 comprises a moving device 38 which moves the inlet opening 32 (i.e. an end part of the discharge duct 31) between a receiving position (illustrated in the FIGS. 13 and 14) in which the inlet opening 32 is in the area of the holding heads 28 arranged in the release position and is designed to receive the cartridge 1 for an electronic cigarette released by (at least) a holding head 28, and a waiting position (illustrated in FIGS. 10, 11 and 12) in which the inlet opening 32 does not interfere with a movement of the holding heads 28 and with a movement of the transport system 6.

In the embodiment illustrated in the attached FIGS. 13 and 14, the moving device 29 moves the holding heads 28 only in a vertical direction of movement between the pick-up position and the release position; consequently, the moving device 29 is simplified as it is provided with a single degree of freedom, and above all cartridge 1 for an electronic cigarette which is lifted by a holding head 28 is subjected only to a vertical movement (therefore only to vertical accelerations). As illustrated in FIG. 9, the moving device 29 comprises a horizontal bracket 39 which rigidly supports the four holding heads 28 and a linear actuator 40 (for example a pneumatic cylinder or an electric motor provided with a mechanical transmission that transforms the rotating movement in a linear way) which supports the bracket 39 in a cantilevered manner and vertically moves the bracket 39.

In the embodiment illustrated in FIGS. 13 and 14, the discharge duct 31 is telescopic in the area of the inlet opening 32 to lengthen or shorten, due to the action of the moving device 38, causing the inlet opening 32 to move between the receiving position and the waiting position; i.e. an end part of the discharge duct 31, provided with the inlet opening 32, is telescopic to lengthen or shorten causing the inlet opening 32 to move between the receiving position and the waiting position.

In the embodiment illustrated in FIGS. 13 and 14, the moving device 38 comprises a linear actuator (for example a pneumatic cylinder or an electric motor provided with a mechanical transmission that transforms the rotary movement in a linear way) that moves the two parts of the discharge duct 31, which slide one relative to the other and form the telescopic mechanism.

In the embodiment illustrated in FIGS. 13 and 14, the discharge duct 31 (i.e. the upper portion of the discharge duct 31 having the inlet opening 32) is arranged inclined relative to a horizontal plane to form an acute angle with the horizontal plane preferably comprised between 30° and 60° (or, from another point of view, it is arranged inclined relative to a vertical plane to form an acute angle with the vertical plane preferably comprised between 30° and 60°). In this way, the telescopic sliding of the discharge duct 31 determines both a vertical movement of the extraction opening 32 and a horizontal movement of the extraction opening 32.

In the embodiment illustrated in FIGS. 15 and 16, the inlet opening 32 (i.e. the entire discharge duct 31) is arranged in a fixed position and, hence, the movement mechanism 38 is absent and the moving device 29 moves the holding head 28 both in a vertical direction of movement and in a horizontal direction of movement. In this embodiment, the discharge duct 31 is simplified (which no longer has moving parts), but the moving device 29 which must be designed to precisely move the holding heads 28 in two directions perpendicular to one another is complicated and above all a cartridge 1 for an electronic cigarette which is lifted by a holding head 28 is subjected to both a vertical movement and a horizontal movement (therefore both vertical accelerations, and horizontal accelerations that combined together could increase the risk of liquid spillage).

To summarize the above, the collecting device 27 comprises a lifter (formed by the holding heads 28) which picks-up (at least) one cartridge 1 for an electronic cigarette from its transport path (i.e. from its seat 8) and keeps it in an elevated position and oriented as during transport (therefore the liquid contained in the cartridge 1 for an electronic cigarette in this case undergoes only a modest vertical acceleration). Furthermore, the collecting device 27 comprises a collecting chute (i.e. the discharge duct 31) which moves diagonally and is arranged below the cartridge 1 for an electronic cigarette which has been extracted from a holding head 28; at this point the holding head 28 descends towards the inlet opening 32 of the discharge duct 31 and then releases the cartridge 1 for an electronic cigarette inside the discharge duct 31 which may or may not accompany the descent movement (to further reduce the accelerations on the liquid contained in the cartridge 1 for an electronic cigarette). When the discharge duct 31 has received the cartridge 1 for an electronic cigarette it performs the reverse movement and returns to the waiting position. Product presence photocells (the sensors 37) will then complete the whole, which point to the top of the lifting movement of the cartridge 1 for an electronic cigarette so as to know for sure if a holding head 28 has actually extracted the cartridge 1 for an electronic cigarette and is actually releasing the same in the discharge duct 31.

The present invention can find application in the production of any type of disposable cartridge not necessarily for an electronic cigarette, for example a disposable cartridge for medical devices (i.e. a disposable cartridge containing medicine or the like).

The embodiments described herein can be combined with each other without departing from the scope of the present invention.

The transport system 6 described above has numerous advantages.

First of all, the transport system 6 described above allows to reach high hourly production (i.e. a number of pieces produced per unit of time) while ensuring a high-quality standard of the cartridges 1 for an electronic cigarette. This result is obtained thanks to the fact that the transport system 6 is designed to hold the more or less complete cartridges 1 for an electronic cigarette in a delicate way (so as not to damage the same) and, at the same time, in a sufficiently firm way to ensure that the more or less complete cartridges 1 for an electronic cigarette are not lost (or in any case are not subject to unwanted shifting) during movement even when this movement imparts upon the more or less complete cartridges 1 for an electronic cigarette relatively high acceleration and deceleration.

Furthermore, the transport system 6 described above allows to extract from the processing path P, efficiently and effectively, also one single cartridge 1 for an electronic cigarette, thus separating the same from all the other cartridges 1 for an electronic cigarette.

Finally, the transport system 6 described above is also easy and inexpensive to manufacture, as it is formed by structurally simple elements provided with few movements that are easy to manufacture.

The extraction station S7 described above has numerous advantages.

Firstly, the extraction station S7 described above allows the cartridges 1 for an electronic cigarette to be extracted from the seats 8 without running the risk that the liquid present in the cartridges 1 for an electronic cigarette can spill in an unwanted way onto the packaging machine 4 thus soiling the same; this result is obtained thanks to the fact that the cartridges for an electronic cigarette are always kept in a vertical position and are not subjected to high acceleration (which could cause spillage of liquid product coming out of the cartridges 1 for an electronic cigarette).

Furthermore, the extraction station S7 described above ensures effective (i.e. it is always designed to guarantee the correct extraction of the cartridges 1 for an electronic cigarette from the seats 8) and efficient operation (i.e. it requires a limited number of movements which can be easily carried out).

Finally, the extraction station S7 described above is particularly compact and robust as well as being easy and inexpensive to manufacture.

The invention claimed is:

1. A transport system (6) for an at least partially complete cartridge (1); the transport system (6) comprising:
   at least one piece of movable equipment (7) provided with at least one seat (8), which is designed to contain the cartridge (1) and is delimited by a first wall (13) and by a second wall (14) beside one another and opposite one another, so that the cartridge (1) can be housed between the first wall (13) and the second wall (14);
   a conveyor (9), which is designed to move the movable equipment (7) along a path (P); and
   an operating device (24), which is arranged on the outside of and is independent from the movable equipment (7) and is arranged along the path (P);
   wherein the first wall (13) is mounted on the movable equipment (7) in a movable manner, so as to move closer to and away from the second wall (14) between a holding position, in which the first wall (13) is at a minimum distance from the second wall (14), and a release position, in which the first wall (13) is at a maximum distance from the second wall (14);
   wherein the movable equipment (7) comprises an elastic element (15), which pushes the first wall (13) towards the second wall (14) and, hence, towards the holding position;
   wherein the movable equipment (7) comprises a control appendage (16), which is mechanically connected to the first wall (13), is movable so as to move the first wall (13) away from the second wall (14) and, hence move the first wall (13) towards the release position, and is designed to be moved by the operating device (24) when the movable equipment (7) is in the area of the operating device (24);
   wherein the operating device (24) comprises a control member (25), which is movable between an inert position, in which the control member (25) does not touch the control appendage (16) when the movable equipment (7) is in the area of the operating device (24), and an operating position, in which the control member (25) touches and moves the control appendage (16) when the movable equipment (7) is in the area of the operating device (24); and
   wherein the control member (25) is mounted in a rotary manner around a first rotation axis (26) so as to rotate between the inert position and the operating position.

2. The transport system (6) according to claim 1, wherein the second wall (14) is mounted on the movable equipment (7) in a fixed position.

3. The transport system (6) according to claim 1, wherein the first rotation axis (26) of the control member (25) is perpendicular to the path (P) followed by the movable equipment (7).

4. The transport system (6) according to claim 1, wherein the control member (25) is mounted in an eccentric manner relative to the first rotation axis (26).

5. The transport system (6) according to claim 1, wherein the control member (25) has a side surface, which is designed to come into contact with the control appendage (16) and is arranged at a variable radial distance from the first rotation axis (26).

6. The transport system (6) according to claim 1, wherein the first wall (13) is mounted on the movable equipment (7) in a rotary manner so as to rotate around a second rotation axis (19).

7. The transport system (6) according to claim 6, wherein the movable equipment (7) comprises a rocker arm (20), which is centrally hinged so as to rotate around the second rotation axis (19) and has a first arm (21), which forms the first wall (13), and a second arm (22), which forms the control appendage (16).

8. The transport system (6) according to claim 7, wherein the elastic element (15) is formed by a helical spring, which is compressed between a fixed striker (23) of the movable equipment (7) and the first arm (21) on an opposite side relative to the seat (8).

9. The transport system (6) according to claim 6, wherein the second rotation axis (19) is parallel to the path (P) followed by the movable equipment (7).

10. The transport system (6) according to claim 1, wherein the control appendage (16) ends with an idle roller (17), which freely rotates around a third rotation axis (18).

11. The transport system (6) according to claim 10, wherein the third rotation axis (18) is perpendicular to the path (P) followed by the movable equipment (7).

12. The transport system (6) according to claim 1, wherein the movable equipment (7) is provided with two seats (8), which are arranged beside one another and one after the other relative to a moving direction of the movable equipment (7) along the path (P).

13. The transport system (6) according to claim 12 and comprising two operating devices (24), which are arranged beside one another and are each designed to act upon the first wall (13) of a corresponding seat (8).

* * * * *